(12) United States Patent
Czerniawski et al.

(10) Patent No.: US 11,808,900 B2
(45) Date of Patent: *Nov. 7, 2023

(54) APPARATUS AND METHOD FOR PROVIDING IN-SITU RADIATION MEASUREMENTS WITHIN A DENSITY EQUIVALENT PACKAGE

(71) Applicant: Rad Source Technologies, Inc., Buford, GA (US)

(72) Inventors: Justin Czerniawski, Roswell, GA (US); Steven Brett, Flowery Branch, GA (US); Shane Jackson, Dawsonville, GA (US)

(73) Assignee: Rad Source Technologies, Inc., Buford, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/544,499

(22) Filed: Dec. 7, 2021

(65) Prior Publication Data
US 2022/0091284 A1    Mar. 24, 2022

Related U.S. Application Data

(63) Continuation of application No. 16/988,342, filed on Aug. 7, 2020, now Pat. No. 11,194,064.

(51) Int. Cl.
*G01T 1/208* (2006.01)
*G01T 1/24* (2006.01)
*G01T 7/00* (2006.01)

(52) U.S. Cl.
CPC .............. *G01T 1/208* (2013.01); *G01T 1/247* (2013.01); *G01T 7/00* (2013.01)

(58) Field of Classification Search
CPC ........... G01T 1/208; G01T 1/247; G01T 7/00; G01T 1/169
See application file for complete search history.

(56) References Cited

U.S. PATENT DOCUMENTS

| 2005/0023477 A1 | 2/2005 | Archer et al. |
| 2007/0140413 A1* | 6/2007 | Saracen ................. G09B 23/30 378/207 |
| 2012/0330083 A1 | 12/2012 | Aitkenhead et al. |
| 2013/0006035 A1 | 1/2013 | Aitkenhead et al. |

\* cited by examiner

*Primary Examiner* — Kiho Kim
(74) *Attorney, Agent, or Firm* — Akerman LLP; Peter A. Chiabotti (57) ABSTRACT

An apparatus for providing in-situ radiation measurements within a density equivalent package is disclosed. The apparatus may include a radiation detector embedded within the density equivalent package that is configured to measure an amount of exposure of a phantom material of the density equivalent package to radiation emitted by an irradiation device. The phantom material may have density equivalence with an object or substance for which radiation exposure information is sought and the phantom material may serve as a substitute for the object or substance. A signal including the measurement of the amount of exposure of the phantom material to the radiation may be provided to a processor of the apparatus for processing. The processor may process the signal to interpret and provide additional information relating to the measurement and may provide the information to a device communicatively linked to the apparatus.

12 Claims, 6 Drawing Sheets

APPARATUS AND METHOD FOR PROVIDING IN-SITU RADIATION MEASUREMENTS WITHIN A DENSITY EQUIVALENT PACKAGE

CROSS-REFERENCE TO RELATED APPLICATIONS

This application is a continuation of and claims the benefit of U.S. patent application Ser. No. 16/988,342, filed on Aug. 7, 2020, the entire contents of which is incorporated by reference herein.

FIELD OF THE INVENTION

The present application relates to irradiation technologies, radiation technologies, radiation measurement technologies, sensor technologies, density equivalence technologies, x-ray technologies, and more particularly, to an apparatus and method for providing in-situ radiation measurements within a density equivalent package.

BACKGROUND

In today's technologically-advanced society, various types of technologies are utilized to decontaminate, sterilize, inactivate, and/or irradiate a variety of different types of things. For example, irradiation devices may be utilized to irradiate blood, sterilize insects, decontaminate food items, inactivate viruses, among a variety of other applications. Currently existing irradiation technologies utilize different types of radiation detectors to measure the amount of radiation exposure a particular object or substance being irradiated has been exposed to. In such existing technologies, the radiation detectors, the processors for processing signals from such detectors, and the power sources for powering the radiation detectors and processors are typically separated from each other and/or are resident in entirely separate devices. Additionally, existing technologies typically conduct processing of radiation exposure data outside of the radiation chamber of an irradiation device and require the use if long and cumbersome wires and/or cabling. Furthermore, currently existing technologies typically require placing the object or substance to be irradiated between the radiation detector and the source of the radiation. Such placement often results in less than optimal radiation exposure measurements.

While current technologies provide for certain benefits and efficiencies, these technologies can be substantially improved and enhanced. In particular, current technologies may be improved so as to provide improved radiation measurement capabilities, improved portability, enhanced processing capabilities, increased accuracy, and reduced overall complexity. Such enhancements and improvements to methodologies and technologies may provide for increased efficiency, increased effectiveness, reduced costs, improved results, and increased ease-of-use.

SUMMARY

A system, apparatus, and accompanying methods for providing in-situ radiation measurements within a density equivalent package are disclosed. In particular, the system, apparatus and methods facilitate the measuring of radiation exposure in-situ by utilizing a radiation detector embedded within a medium having density equivalence with a particular object or substance. For example, instead of measuring radiation exposure of an actual food item, the system, apparatus, and accompanying methods provide for the use of a phantom material-based medium that has density equivalence with the food item so that when the medium is exposed to radiation, the radiation measurements obtained for the medium correspond with the radiation measurements that would be obtained if the actual food item was exposed to the radiation. In certain embodiments, the density equivalent package including the phantom material may be included within a portable radiation detection device.

The system, apparatus, and accompanying methods may utilize the radiation detector embedded within the medium to generate a current signal including measurements associated with the radiation exposure of the phantom material of the density equivalent package when the portable radiation detection device is positioned within range of a radiation field generated by an irradiation device. The current signal may be transmitted by the radiation detector to a processor of the portable radiation detection device to interpret and process the current signal to generate information associated with the radiation exposure. In certain embodiments, the processor may store the signal and/or the generated information in a cache of the processor and/or potentially a memory of the portable radiation detection device. In certain embodiments, the signal and/or the generated information may be transmitted to a device communicatively linked to the portable radiation detection device, such as via wireless and/or wired transmission. The device communicatively linked to the portable radiation detection device may be configured to analyze the received signal and/or information, store the received signal and/or information, display an output associated with the signal and/or information, and/or perform other actions with respect to the signal and/or information. Notably, various embodiments of the apparatus, system, and/or accompanying methods are provided herein.

To that end, in an embodiment, a portable device for providing radiation measurements in-situ is disclosed. The portable device may include a housing within which a density equivalent package comprising a phantom material may reside. The phantom material may be utilized to represent and serve as a substitute for an object or substance for which radiation exposure information is sought. In certain embodiments, the portable device may include a radiation detector that is embedded within the density equivalent package and which is configured to measure an amount of exposure of the phantom material of the density equivalent package to radiation emitted by an irradiation device. The radiation detector of the portable device may transmit a current signal including the radiation exposure measurement to a processor of the portable device for further processing. The processor may process and interpret the current signal so as to provide information relating to the radiation exposure measurement. The processor may store the information and/or signal and may transmit the information and/or signal to a device communicatively linked to the portable device, such as for further analysis, display, and/or processing.

In another embodiment, a method for providing radiation measurements in-situ is disclosed. The method may include activating a portable radiation detection device configured to provide in-situ radiation measurements within a density equivalent phantom material package of the portable radiation detection device. Additionally, the method may include positioning the portable radiation detection device within range of a radiation field generated by an irradiation device. The method may then include measuring an amount of exposure of the density equivalent phantom material package to radiation from the radiation field. The method may then include providing, via a radiation detector of the portable radiation detection device, a current signal including the radiation measurement to a processor of the portable radiation detection device. Furthermore, the method may include processing and interpreting the current signal to generate information associated with the radiation measurement. Moreover, the method may include storing the current signal and/or information and transmitting the current signal and/or information to a device communicatively linked to the portable radiation detection device, such as for further processing, display, and/or analysis.

In another embodiment, a device for providing radiation measurements in-situ is provided. In certain embodiments, the device may include a housing; a phantom material representing an object or substance to be irradiated by an irradiator; wherein the phantom material has density equivalence with the object or substance to be irradiated; and a radiation detector embedded within the housing and the phantom material, wherein the radiation detector measures an amount of exposure of the phantom material to radiation when an irradiation device emits the radiation within range of the phantom material.

These and other features of the systems and methods for providing radiation measurements in-situ are described in the following detailed description, drawings, and appended claims.

DETAILED DESCRIPTION OF THE DRAWINGS

A system 100, apparatus (e.g. device 200), and accompanying methods for providing in-situ radiation measurements within a density equivalent package are disclosed. In particular, the system 100, apparatus and methods may facilitate the measuring of radiation exposure in-situ by utilizing a radiation detector 225 that is embedded within a medium 215 having density equivalence with an object, organism, and/or substance of interest. For example, instead of measuring radiation exposure of a virus sample, the system 100, apparatus, and accompanying methods provide for the use of a phantom material-based medium that has density equivalence with the virus sample so that when the medium is exposed to radiation, the radiation measurements obtained for the medium correspond with the radiation measurements that would be obtained if the actual virus sample was exposed to the radiation. In certain embodiments, the density equivalent package including the phantom material may be included within a portable radiation detection device (e.g. device 200).

The system 100, apparatus, and accompanying methods may utilize the radiation detector 225 embedded within the medium 215, such as within grooves 220, to generate a current signal including measurements associated with the radiation exposure of the phantom material of the density equivalent package when the portable radiation detection device is positioned within range of a radiation field generated by an irradiation device 180. The current signal may be transmitted by the radiation detector 225 to a processor 250 of the portable radiation detection device to interpret and process the current signal to generate information associated with the radiation exposure. In certain embodiments, the processor 250 may store the signal and/or the generated information in a cache of the processor 250 and/or a memory of the portable radiation detection device 200. In certain embodiments, the signal and/or the generated information may be transmitted to a device (e.g. first user device 102, second user device 111, and/or other devices of system 100) communicatively linked to the portable radiation detection device 200, such as via wireless and/or wired transmission. The device communicatively linked to the portable radiation detection device 200 may be configured to analyze the received signal and/or information, store the received signal and/or information, display an output associated with the signal and/or information, and/or perform other actions with respect to the signal and/or information. Notably, in certain embodiments, the portable radiation detection device 200 may be configured to measure radiation exposure within a representative sample that lies within the portable radiation detection device 200 itself. Such a capability provides substantial improvements over existing technologies, which typically involve utilizing different and separate devices to conduct radiation detection, utilizing separate devices to conduct processing, and which incorporate the use of long and often tangle-prone wires.

As shown in FIG. 1 and referring also to FIGS. 1-6, a system 100 for providing in-situ radiation measurements within a density equivalent package is disclosed. Notably, in certain embodiments, the portable radiation detection device 200 and/or irradiation device 180 of the system 100 may be manually operated by a user, such as first user 101 and/or second user 110. For example, the irradiation device 180 may be activated via a switch of irradiation device 180 and deactivated via the same switch or a different switch. Similarly, a switch 230 of the portable radiation detection device 200 may be utilized to activate or deactivate the portable radiation detection device 200. In certain embodiments, the portable radiation detection device 200 and/or irradiation device 180 may be entirely operated by utilizing the system 100 or operated by using a combination of a user and the system 100. In certain embodiments, the portable radiation detection device 200 and/or irradiation device 180 may be operated by an automated computing system and/or robot. Notably, the system 100 may be configured to support, but is not limited to supporting, radiation measurement technologies, radiation devices, services for facilitating operation of a radiation device, services for facilitating operation of the portable radiation detection device 200 and/or irradiation device 180, data analyzing services, data gathering services, content delivery services, surveillance and monitoring services, cloud computing services, satellite services, telephone services, voice-over-internet protocol services (VoIP), software as a service (SaaS) applications, platform as a service (PaaS) applications, gaming applications and services, social media applications and services, operations management applications and services, productivity applications and services, mobile applications and services, and/or any other computing applications and services.

Notably, the system 100 may include a first user 101, who may utilize a first user device 102 to access data, content, and services, or to perform a variety of other tasks and functions. As an example, the first user 101 may utilize first user device 102 to transmit signals to access various online services and content, such as those available on an internet, on other devices, and/or on various computing systems. In certain embodiments, the first user 101 may be an individual that may seek to irradiate various samples for a variety of purposes. In certain embodiments, the first user 101 may be seeking to irradiate samples of food, viruses, bacteria, medical devices, blood, cannabis, plants, cells, cosmetics, agricultural products, packaging, any object, any substance, or a combination thereof. In certain embodiments, the first user 101 may be a robot, a computer, a program, a process, a human, any type of user, or any combination thereof. The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102 and to interact with the system 100. In certain embodiments, the first user device 102 may be and/or may include a computer, any type of sensor, a laptop, a set-top-box, a tablet device, a phablet, a server, a mobile device, a smartphone, a smart watch, and/or any other type of computing device. Illustratively, the first user device 102 is shown as a smartphone device in FIG. 1. In certain embodiments, the first user device 102 may be utilized by the first user 101 to control the operative functionality of the irradiation device 180, the portable radiation detection device 200, and/or other devices and/or components in the system 100.

In addition to using first user device 102, the first user 101 may also utilize and/or have access to additional user devices. As with first user device 102, the first user 101 may utilize the additional user devices to transmit signals to access various online services and content. The additional user devices may include memories that include instructions, and processors that executes the instructions from the memories to perform the various operations that are performed by the additional user devices. In certain embodiments, the processors of the additional user devices may be hardware, software, or a combination thereof. The additional user devices may also include interfaces that may enable the first user 101 to interact with various applications executing on the additional user devices and to interact with the system 100. In certain embodiments, the additional user devices may be and/or may include a computer, any type of sensor, a monitoring device, a laptop, a set-top-box, a tablet device, a phablet, a server, a mobile device, a smartphone, a smart watch, and/or any other type of computing device, and/or any combination thereof.

The first user device 102 and/or additional user devices may belong to and/or form a communications network. In certain embodiments, the communications network may be a local, mesh, or other network that enables and/or facilitates various aspects of the functionality of the system 100. In certain embodiments, the communications network may be formed between the first user device 102 and additional user devices through the use of any type of wireless or other protocol and/or technology, such as, but not limited to Bluetooth, Wi-Fi, radio frequency technologies, short-range wireless technologies, mid-range wireless technologies, long-range wireless technologies, internet-of-things technologies, any other technologies, or a combination thereof. For example, user devices may communicate with one another in the communications network by utilizing any protocol and/or wireless technology, satellite, fiber, or any combination thereof. Notably, the communications network may be configured to communicatively link with and/or communicate with any other network of the system 100 and/or outside the system 100.

In certain embodiments, the first user device 102 and additional user devices belonging to the communications network may share and exchange data with each other via the communications network. For example, the user devices may share information relating to the various components of the user devices, information identifying the locations of the user devices, information indicating the types of sensors that are contained in and/or on the user devices, information identifying the applications being utilized on the user devices, information identifying how the user devices are being utilized by a user, information associated with the portable radiation detection device 200, information associated with the irradiation device 180, information indicating any information associated with the operation of the irradiation device 180, information associated with samples being irradiated (e.g. temperature of the sample, a change(s) occurring to the sample, a weight of the sample, a size of the sample, whether radiation is affecting the sample, whether the sample is moving or stationary, any other information associated with the sample, or a combination thereof), information associated with the density equivalent package 215 (i.e. phantom material medium), information associated with radiation exposure of the density equivalent package 215 to radiation, information identifying user profiles for users of the user devices, information identifying device profiles for the user devices, information identifying the number of devices in the communications network, information identifying devices being added to or removed from the communications network, any other information, or any combination thereof.

In addition to the first user 101, the system 100 may also include a second user 110, who may utilize a second user device 111 to perform a variety of functions. For example, the second user device 111 may be utilized by the second user 110 to transmit signals to request various types of content, services, and data provided by and/or accessible by communications network 135 or any other network in the system 100. In certain embodiments, the second user 110 may be an individual that may seek to irradiate insects, food, viruses, organisms, bacteria, medical devices, blood, cannabis, plants, cells, cosmetics, clothing, fabrics, agricultural products, packaging, any object, any substance, or a combination thereof. In further embodiments, the second user 110 may be a robot, a computer, a program, a process, any type of user, or any combination thereof. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g. screen, monitor, graphical user interface, etc.) that may enable the second user 110 to interact with various applications executing on the second user device 111 and to interact with the system 100. In certain embodiments, the second user device 111 may be a computer, a laptop, a set-top-box, a tablet device, a phablet, a server, a mobile device, a smartphone, a smart watch, and/or any other type of computing device. Illustratively, the second user device 111 is shown as a tablet device in FIG. 1.

In certain embodiments, the first user device 102, the additional user devices, and/or the second user device 111 may have any number of software applications and/or application services stored and/or accessible thereon. For example, the first user device 102, the additional user devices, and/or the second user device 111 may include applications for controlling the irradiation device 180, applications for controlling the portable radiation detection device 200, applications for controlling any device, program, system, and/or component of the system 100, monitoring applications, sensor data analysis applications, applications for analyzing and interpreting radiation exposure measurements, interactive social media applications, biometric applications, cloud-based applications, VoIP applications, other types of phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications may support the functionality provided by the system 100 and methods described in the present disclosure. In certain embodiments, the software applications and services may include one or more graphical user interfaces so as to enable the first and second users 101, 110 to readily interact with the software applications. The software applications and services may also be utilized by the first and second users 101, 110 to interact with any device in the system 100, any network in the system 100, or any combination thereof. In certain embodiments, the first user device 102, the additional user devices, and/or the second user device 111 may include associated telephone numbers, device identities, or any other identifiers to uniquely identify the first user device 102, the additional user devices, and/or the second user device 111.

The system 100 may also include a communications network 135. The communications network 135 may be under the control of a service provider, the first user 101, the second user 110, any other designated user, a computer, another network, or a combination thereof. The communications network 135 of the system 100 may be configured to link each of the devices in the system 100 to one another. For example, the communications network 135 may be utilized by the first user device 102 to connect with other devices within or outside communications network 135, such as, but not limited to, the irradiation device 180, the portable radiation detection device 200, and/or any other devices, programs, systems, or a combination thereof. Additionally, the communications network 135 may be configured to transmit, generate, and receive any information and data traversing the system 100. In certain embodiments, the communications network 135 may include any number of servers, databases, or other componentry. The communications network 135 may also include and be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, any network, or any combination thereof. Illustratively, servers 140, 145, and 150 are shown as being included within communications network 135. In certain embodiments, the communications network 135 may be part of a single autonomous system that is located in a particular geographic region, or be part of multiple autonomous systems that span several geographic regions.

Notably, the functionality of the system 100 may be supported and executed by using any combination of the servers 140, 145, 150, and 160. The servers 140, 145, and 150 may reside in communications network 135, however, in certain embodiments, the servers 140, 145, 150 may reside outside communications network 135. The servers 140, 145, and 150 may provide and serve as a server service that performs the various operations and functions provided by the system 100. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. Furthermore, the server 150 may include a memory 151 that includes instructions, and a processor 152 that executes the instructions from the memory 151 to perform the various operations that are performed by the server 150. In certain embodiments, the servers 140, 145, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 145, 150 may be communicatively linked to the communications network 135, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operation associated with the database 155. In certain embodiments, the database 155 may be connected to the servers 140, 145, 150, 160, the first user device 102, the second user device 111, the additional user devices, the irradiation device 180, the portable radiation detection device 200, any devices in the system 100, any process of the system 100, any program of the system 100, any other device, any network, or any combination thereof.

The database 155 may also store information and metadata obtained from the system 100, store metadata and other information associated with the first and second users 101, 110, store data generated and/or received by the irradiation device 180, store data generated and/or received by the portable radiation detection device 200, store radiation exposure measurements, store analyses relating to the radiation exposure measurements, store sensor measurements (e.g. temperature, pressure, moisture, acceleration, orientation, biometric, light, sound, and/or any other types of sensor measurements) obtained via sensors of the irradiation device 180 and/or portable radiation detection device 200, storing any type of sensor reading from any type of sensor of the system 100, store analyses of the sensor readings, store user profiles associated with the first and second users 101, 110, store device profiles associated with any device in the system 100, store communications traversing the system 100, store user preferences, store information associated with any device or signal in the system 100, store information relating to patterns of usage relating to the user devices 102, 111, store any information obtained from any of the networks in the system 100, store historical data associated with the first and second users 101, 110, store device characteristics, store information relating to any devices associated with the first and second users 101, 110, store information associated with the communications network 135, store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

As shown in the diagrams and schematics illustrated in FIGS. 1-4, the system 100 may include a portable radiation detection device 200. The portable radiation detection device 200 may be utilized to measure radiation exposure in-situ by utilizing a radiation detector 225 embedded within a density equivalent package 215 of the portable radiation detection device 200. In certain embodiments, the portable radiation detection device 200 may be of any desired size, shape, dimensions, and/or material. For example, in FIGS. 1-4, the portable radiation detection device 200 has a shape of a cylindrical canister, however, in other embodiments, any type of shape may be utilized. In certain embodiments, the portable radiation detection device 200 may be portable, however, in certain embodiments, it may be fixed in a particular location or position. In certain embodiments, portable radiation detection device 200 may include, but is not limited to including, a first portion 202 (e.g. a top portion), a second portion 210 (e.g. a bottom portion), a density equivalent package 215 including phantom material serving as a substitute for an object, organism, or substance of interest, a radiation detector 225, a switch 230, a power source 235, a port 240, a cable 245, and a processor 250. In certain embodiments, the portable radiation detection device 200 may also include a memory, a transceiver, a wireless chip for long and/or short-range communication, any type of sensors, or a combination thereof.

Figure 3:
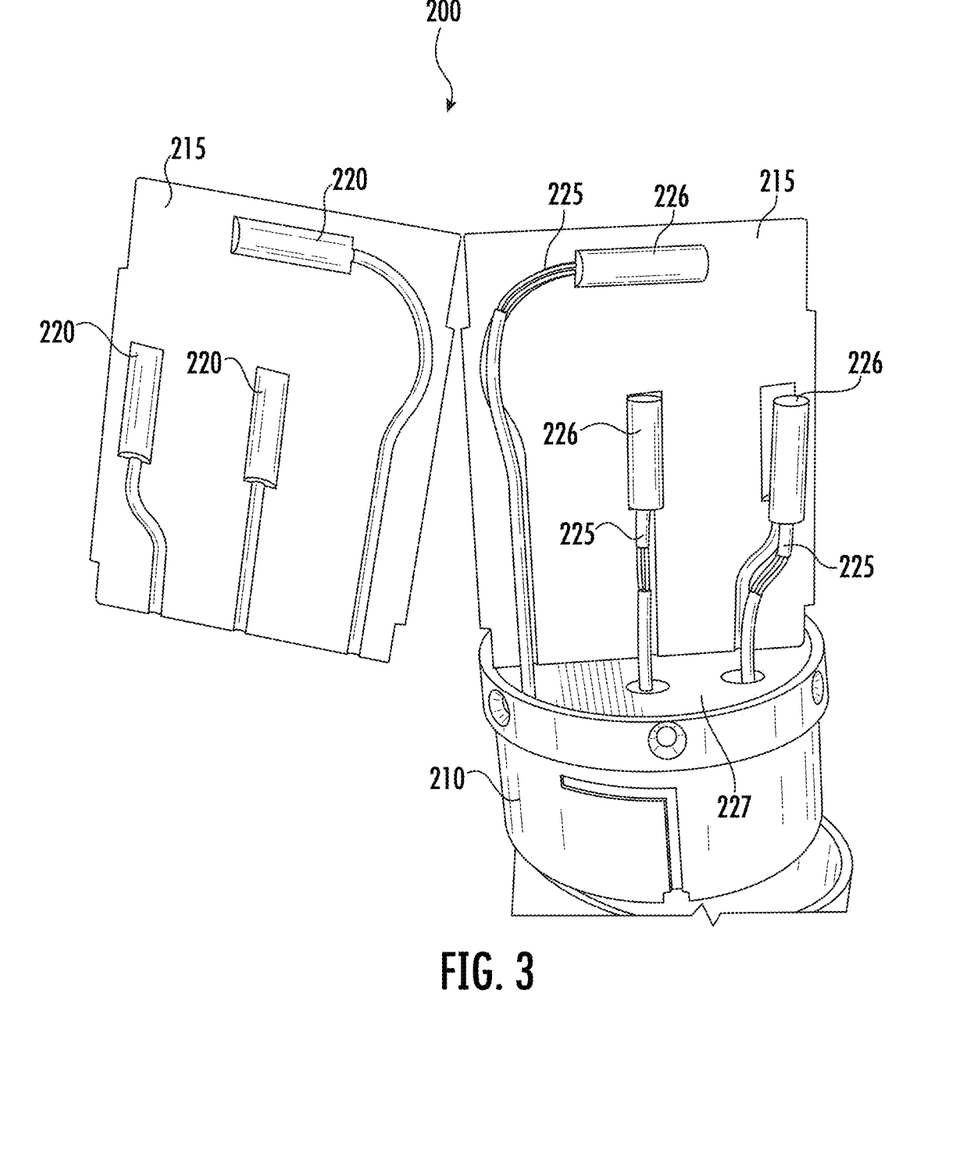
FIG. 3 is a perspective view of radiation detectors embedded inside the device of FIG. 2 according to an embodiment of the present disclosure.
Figure 4:
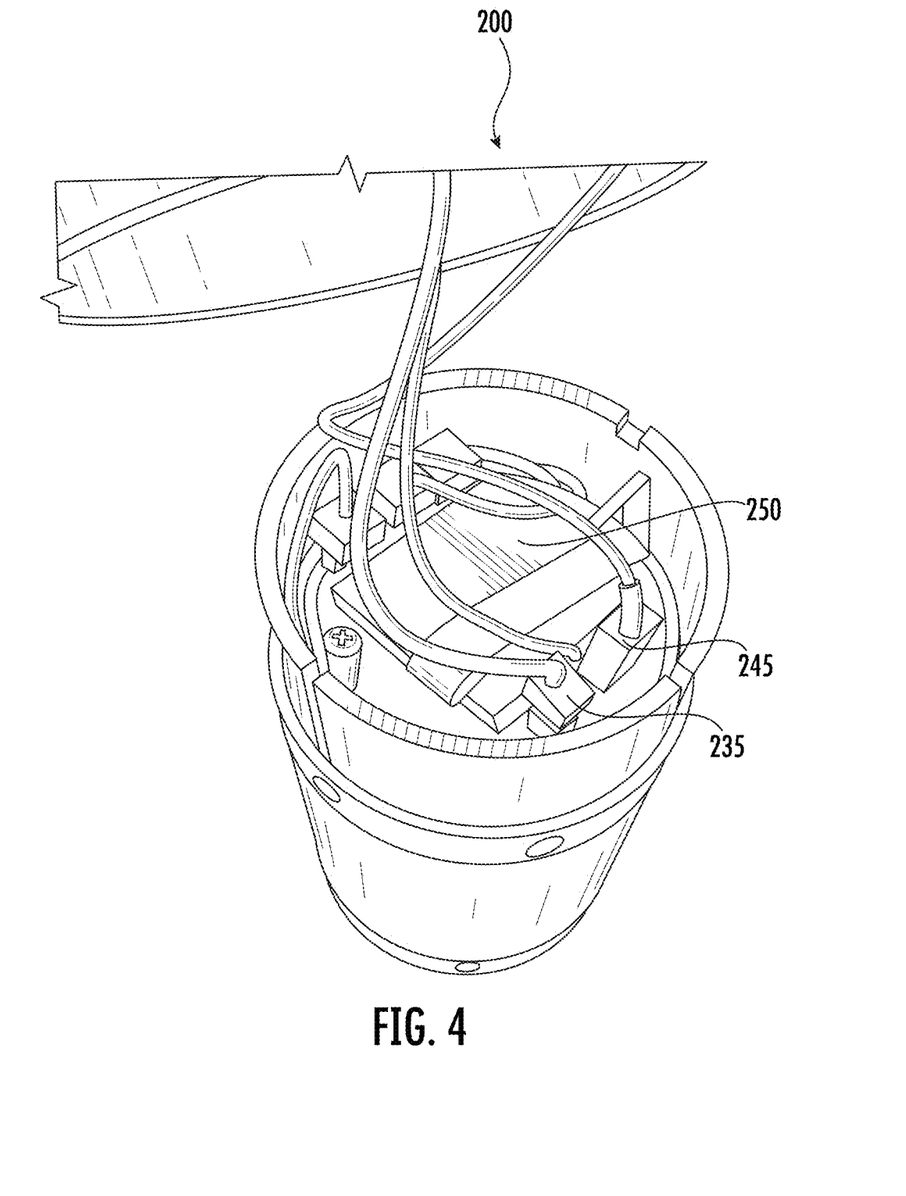
FIG. 4 is a top angled perspective view of the device of FIG. 2 illustrating internal processing components of the device according to an embodiment of the present disclosure.

In certain embodiments, the first portion 202 may be where the switch 230, the power source 235, the port 240, the cable 245, and/or the processor 250 reside. In certain embodiments, the first portion 202 may be removable from the second portion 210, and the first portion 202 may be configured to attach to the second portion 210, such as via an interference fit, screws, fasteners, and/or other securing mechanisms. The density equivalent package 215 may serve as a substitute for an object, substance, organism, and/or anything for which radiation exposure information is sought. In certain embodiments, the density equivalent package 215 may be made of a phantom material, which may include, but is not limited to including, plastics, ceramics, hops, foams, gels, any type of material, or a combination thereof. In certain embodiments, the density equivalent package 215 may have any shape, design, and/or structure. In certain embodiments, the density equivalent package 215 may take the form of two plates, as shown in FIG. 3, and may be configured to reside within the second portion 210 of the portable radiation detection device 200. The two plates of the density equivalent package 215 may include grooves 220, which may be sized and shaped to receive wires and/or other components of the radiation detector 225. In certain embodiments, ends of the wires facilitating the operation of the radiation detector 225 may be secured using caps 226. When the wires and/or components of the radiation detector 225 are positioned securely within the grooves 220, the plates of the density equivalent package 215 may be secured together such that the wires and/or components of the radiation detector 225 reside partially or entirely within the grooves 220 of the density equivalent package 215.

The secured density equivalent package 215 and the radiation detector 225 may be inserted into an opening 227 of the second portion 210, as shown in FIG. 3. The opening 227 may be closed once the density equivalent package 215 and radiation detector 215 are secured within the second portion 210, such as by utilizing a cap or other mechanism for closing the opening 227. In this way, the radiation detector 225 may be embedded within the phantom material of the density equivalent package 215 and may be configured to obtain optimal radiation exposure measurements associated with the phantom material. In certain embodiments, the second portion 210, as a result, may serve as a radiation chamber for the density equivalent package 215. In certain embodiments, the radiation detector 225 may be an ion chamber, a semiconductor-based radiation detector, a solid-state-based radiation detector, a scintillator, and/or any other type of radiation detector 225. The radiation detector 225 may be coupled to the power source 235 so that it may receive power from the power source when the portable radiation detection device 200 is activated. In certain embodiments, the switch 230 of the portable radiation detection device 200 may be utilized to activate or deactivate the portable radiation detection device 200 and may be connected to the power source 235, which may provide power to the components of the portable radiation detection device 200. In certain embodiments, the power source 230 may be a radiation-shielded battery, any other type of battery, an electrical power source, and/or any other power source that may be utilized to provide power to the components of the portable radiation detection device 200.

The radiation detector 225 itself may be configured to measure an amount of radiation exposure of the phantom material of the density equivalent package 215, such as when the portable radiation detection device 200 is within range of a radiation field generated by an irradiation device 180. The measure of the amount of radiation exposure may be in rad units, gray units, rem units, sievert units, curie units, becquerel units, disintegration units, and/or any other radiation-related units. The radiation detector 225, when measuring the radiation exposure of the phantom material of the density equivalent package 215, may generate a current signal including the radiation exposure measurement(s). The current signal(s) generated by the radiation detector 225 may be transmitted by the radiation detector 225 to the processor 250 at any desired interval or continuously while in operation. The processor 250 may be analyzing, interpret, and/or process the current signal so as to generate a numerical value of the radiation exposure measurement, convert the current signal to a digital signal, extract any radiation exposure-related information from the current signal, or a combination thereof. In certain embodiments, the processor 250 may include a cache, which may be configured to store the signal and/or information generated based on processing of the signal. Additionally, the processor 250 may be radiation-shielded so as to protect the processor 250 from radiation generated by an irradiation device 180. In certain embodiments, the portable radiation detection device 200 may have a separate memory, which may also be configured to store the signal and/or information generated based on the processing of the signal.

In certain embodiments, the processed signal and/or information extracted from the signal may be transmitted to a device, such as first user device 102, second user device 111, and/or any other device of the system 100. In order to do so, the processed signal and/or information may be transmitted by the processor 250 to the device via a wired link, a wireless link, or both. For example, the processed signal and/or information may be transmitted by the processer 250 via the cable 245 to the device, which may be connected to the portable radiation detection device via port 240. In certain embodiments, the port 240 may be a universal serial bus port or any type of communications port. As another example, the portable radiation detection device 200 may include a wireless chip (e.g. NFC, Bluetooth, etc.), transceiver, or other communications component, which may allow the processed signal and/or information to be transmitted wirelessly from the portable radiation detection device 200 to the device. In certain embodiments, the device may conduct further processing on the signal and/or information, display the information, extract further information from the information (e.g. radiation exposure information, radiation absorption information, an effect on the phantom material, etc.), store the information, conduct any operation on the information and/or signal, or a combination thereof.

In certain embodiments, the portable radiation detection device 200 may include any number of sensors, such as, but not limited to, light sensors, temperature sensors, pressure sensors, moisture sensors, accelerometers, orientation sensors, cameras, motion sensors, heat sensors, fault sensors, radiation sensors, any type of sensors, or a combination thereof. The conditions monitored by the sensors may include, but are not limited to, temperature, pressure, moisture, orientation, light levels, media content (e.g. video, audio, images, etc.) of the componentry of the portable radiation detection device 200, motion, heat, faults, radiation levels (e.g. exposure levels), and/or any other conditions. In certain embodiments, any one or more of the sensors may be utilized to calculate phantom material exposure to radiation. In certain embodiments, the sensors may be positioned anywhere on and/or within the portable radiation detection device 200. In certain embodiments, the sensors may be powered via the power source 235, such as a battery and/or via a plug connected to an electrical socket, however, in certain embodiments, the sensors may include power sources within the sensors themselves. For example, the sensors may be activated via radio frequency signals, which may activate and power circuits within the sensors themselves. Sensor data generated by the sensors may be provided to the processor 250 and/or a device communicatively linked to the portable radiation detection device 200.

Furthermore, the system 100 may also include an irradiation device 180, which may be a device that may be configured irradiate samples placed within range of a radiation field generated by the irradiation device 180 and/or within a chamber of the irradiation device 180. The irradiation device 180 may be utilized to sterilize, sanitize, clean, and/or irradiate samples including, but not limited to, insects, any type of organism, viruses, food, bacteria, medical devices, blood, cannabis, plants, cells, cosmetics, agricultural products, packaging, any object, any substance, or a combination thereof. In certain embodiments, the irradiation device 180 may include a processor 181, a memory 182, and/or a transceiver 183 (and/or wireless communications chip). The irradiation device 180 may include a chamber within which the portable radiation detection device 200 may be positioned so that it may be irradiated and exposed to radiation. In certain embodiments, instead of placing the portable radiation detection device 100 within the chamber, the portable radiation detection device 200 may be placed within range of the radiation field generated by the irradiation device 180.

Figure 1:
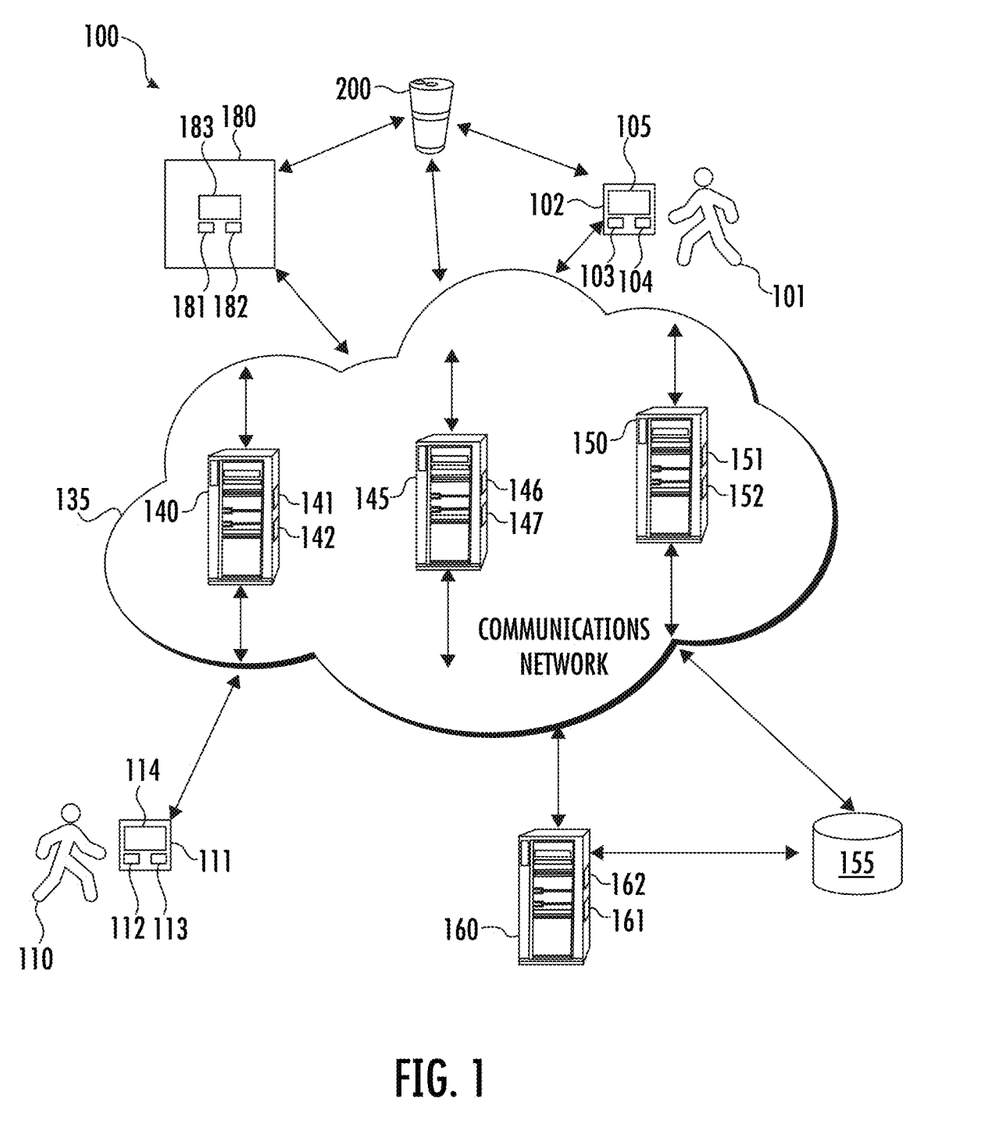
FIG. 1 is a schematic diagram of a system for providing in-situ radiation measurements within a density equivalent package according to an embodiment of the present disclosure.
Figure 2:
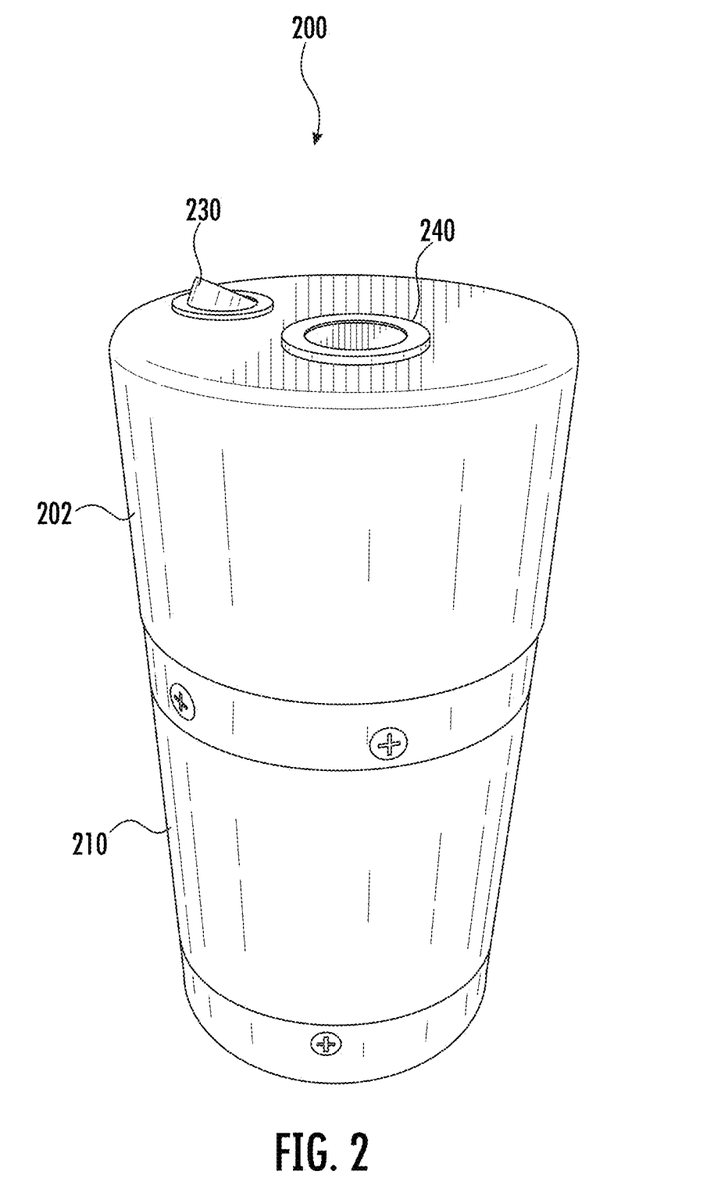
FIG. 2 is a front perspective view of a device including density equivalent material for use with the system of FIG. 1 according to an embodiment of the present disclosure.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, activating and/or deactivating the irradiation device 180 and/or portable radiation detection device 200; positioning the portable radiation detection device within range of a radiation field generated by the irradiation device 180, measuring an amount of exposure of the density equivalent phantom material package to radiation of the radiation field; providing and/or generating a signal including the measurement of radiation exposure; processing and/or interpreting the signal to generate additional information relating to the radiation exposure measurement; storing the signal and/or information; transmitting the signal and/or information to a device communicatively linked to the portable radiation detection device 200; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIGS. 1-6 illustrates specific example configurations of the various components of the system 100, the system 100 may include any configuration of the components, which may include using a greater or lesser number of the components. For example, the system 100 is illustratively shown as including a first user device 102, a second user device 111, an irradiation device 180, a portable radiation detection device 200, a communications network 135, a server 140, a server 145, a server 150, a server 160, and a database 155. However, the system 100 may include multiple first user devices 102, multiple second user devices 111, multiple irradiation devices 180, multiple portable radiation detection devices 200, multiple communications networks 135, multiple servers 140, multiple servers 145, multiple servers 150, multiple servers 160, multiple databases 155, or any number of any of the other components inside or outside the system 100. Furthermore, in certain embodiments, substantial portions of the functionality and operations of the system 100 may be performed by other networks and systems that may be connected to system 100.

Figure 5:
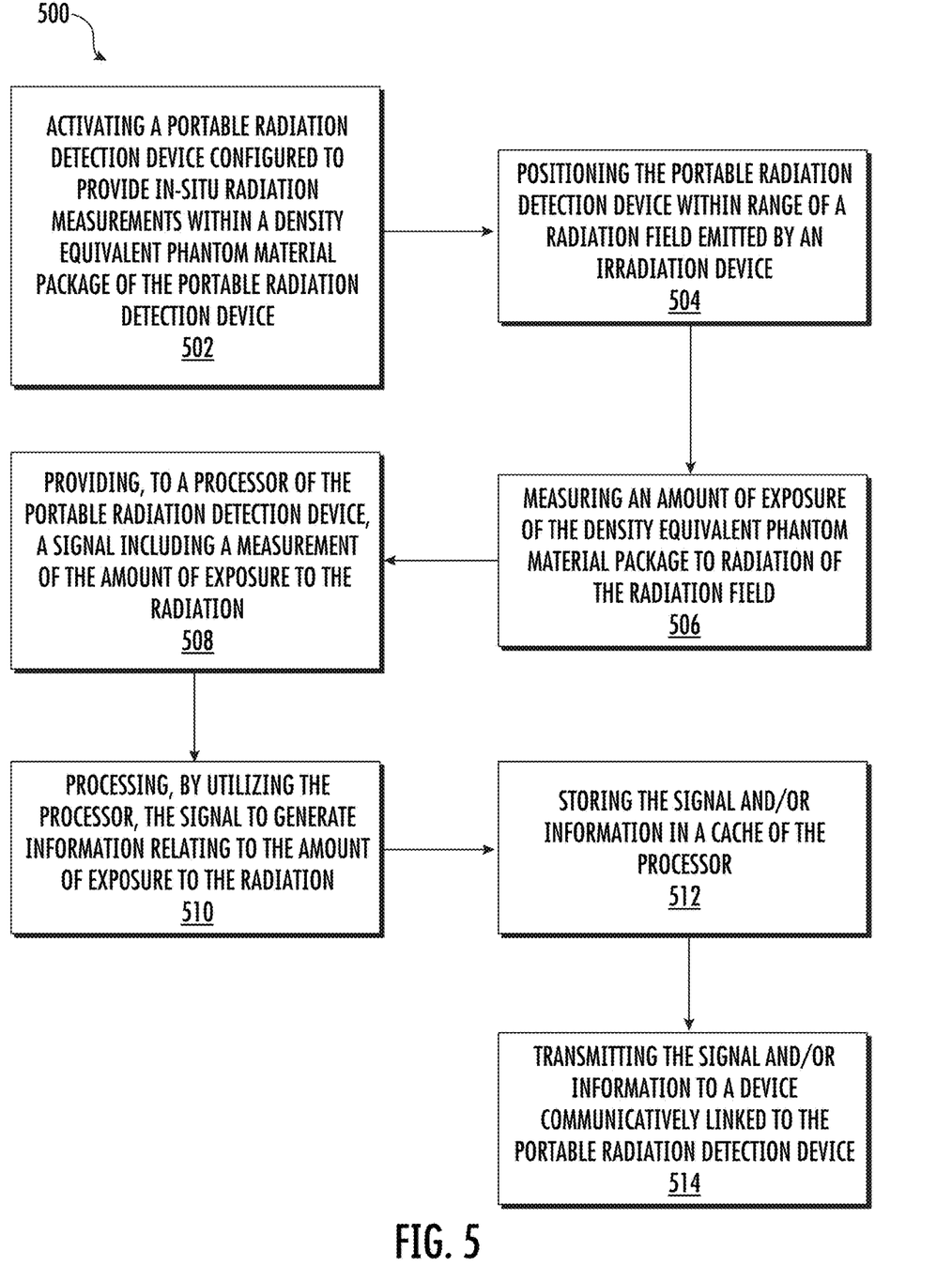
FIG. 5 is a flow diagram illustrating a sample method for providing in-situ radiation measurements within a density equivalent package according to an embodiment of the present disclosure.

Notably, the system 100 may execute and/or conduct the functionality as described in the method(s) that follow. As shown in FIG. 5, an exemplary method 500 for providing in-situ radiation measurements via a portable radiation detection device including a density equivalent package is schematically illustrated. The method 502 may include steps for utilizing the portable radiation detection device to measure radiation exposure of a phantom material of a density equivalent package of the portable radiation detection device when the portable radiation detection device is within range of a radiation field generated by an irradiation device 180. In certain embodiments, certain steps of the method 500 may be optional and/or certain steps may be performed in different orders. At step 502, the method 500 may include activating a portable radiation detection device 200 that may be configured to provide in-situ radiation measurements via a density equivalent phantom material package of the portable radiation detection device 200. For example, the portable radiation detection device 200 may be activated by pressing on the switch 230 of the portable radiation detection device 200. The density equivalent package 215 may be made of phantom material that may be utilized to represent and/or substitute an object, substance, organism, and/or anything for which radiation exposure information is sought. For example, the phantom material may have a density that corresponds to blood, fruit, or an organism. In certain embodiments, the activating of the portable radiation detection device 200 may be performed and/or facilitated by the first user 101, the second user 110 and/or by utilizing the first user device 102, second user device 111, the server 140, the server 145, the server 150, the server 160, the communications network 135, the irradiation device 180, any combination thereof, or by utilizing any other appropriate program, network, system, or device.

At step 504, the method 500 may include positioning the portable radiation detection device 200 within range of the radiation field generated and/or emitted by an irradiation device 180. In certain embodiments, the positioning may comprise placing the portable radiation detection device 200 in proximity to the irradiation device 180 or within a chamber of the irradiation device 180. In certain embodiments, the positioning of the portable radiation detection device 200 may be performed and/or facilitated by the first user 101, the second user 110 and/or by utilizing the first user device 102, second user device 111, the server 140, the server 145, the server 150, the server 160, the communications network 135, the irradiation device 180, any combination thereof, or by utilizing any other appropriate program, network, system, or device. At step 506, the method 500 may include measuring an amount of exposure of the phantom material of the density equivalent package 215 to radiation of the radiation field. In certain embodiments, the radiation detector 225 embedded within the density equivalent package 215 may be configured to measure the radiation exposure when the portable radiation detection device 200 is within range of the radiation emitted by the irradiation device 180. In certain embodiments, the measuring may be performed and/or facilitated by utilizing the first user device 102, second user device 111, the server 140, the server 145, the server 150, the server 160, the communications network 135, the irradiation device 180, any combination thereof, or by utilizing any other appropriate program, network, system, or device.

At step 508, the method 500 may include providing, to a processor 250 of the portable radiation detection device 200, a current signal including the measurement of the radiation exposure. In certain embodiments, the signal may be generated by the radiation detector 225 itself. In certain embodiments, the providing of the current signal to the processor 250 may be performed and/or facilitated by utilizing the first user device 102, second user device 111, the server 140, the server 145, the server 150, the server 160, the communications network 135, the irradiation device 180, any combination thereof, or by utilizing any other appropriate program, network, system, or device. At step 510, the method 500 may include processing, by utilizing the processor 250 of the portable radiation detection device 200, the current signal to generate information relating to the amount of radiation exposure. For example, the processing may involve interpreting the current signal, generating a numerical value of the radiation exposure measurement, analyzing the current measurement, determining an effect of the radiation on the phantom material of the density equivalent package 215, any other information, or a combination thereof. At step 512, the method 500 may include storing the signal and/or processed information in a cache of the processor and/or a memory of the portable radiation detection device 200. In certain embodiments, the storing of the signal and/or information may be performed and/or facilitated by utilizing the first user device 102, second user device 111, the server 140, the server 145, the server 150, the server 160, the communications network 135, the irradiation device 180, any combination thereof, or by utilizing any other appropriate program, network, system, or device. At step 514, the method 500 may include transmitting the signal and/or information to a device (e.g. first user device 102 or other device of the system 100) communicatively linked to the portable radiation detection device 200. In certain embodiments, the transmission may occur via a direct cable link to the device (e.g. via a physical connection to port 240), a wireless connection with the device (e.g. such as via wireless transfer of data from a transceiver or wireless chip of the portable radiation detection device 200 to the device), or a combination thereof. In certain embodiments, the transmission may be performed and/or facilitated by utilizing the first user device 102, second user device 111, the server 140, the server 145, the server 150, the server 160, the communications network 135, the irradiation device 180, any combination thereof, or by utilizing any other appropriate program, network, system, or device. Once the device receives the signal and/or information, the device may process the signal and/or information further, modify the signal and/or information, display information associated with the signal and/or information, storing the signal and/or information, and/or perform any other actions with respect to the signal and/or information. Notably, the method 500 may further incorporate any of the features and functionality described for the system 100, any other method disclosed herein, or as otherwise described herein.

The systems and methods disclosed herein may include additional functionality and features. For example, in certain embodiments, the portable radiation detection device 200 may be controlled directly by any other device of the system 100, such as first and/or second user devices 102, 111. In certain embodiments, the portable radiation detection device 200 may be controlled simply via the switch 230. In certain embodiments, the portable radiation detection device 200 may include an interface, which may be configured to display the radiation exposure measurements in real-time as the measurements are taken by the radiation detector 225. In certain embodiments, the portable radiation detection device 200 can have any configuration and/or density. For example, the phantom material of the density equivalence package 215 may have the density equivalence of mice, blood, apples, oranges, fruits, plants, cannabis, hops, any organism, any substance, any object, or a combination thereof.

The systems and methods disclosed herein may include further functionality and features. For example, the operative functions of the system 100 and method may be configured to execute on a special-purpose processor specifically configured to carry out the operations provided by the system 100 and method. Notably, the operative features and functionality provided by the system 100 and method may increase the efficiency of computing devices that are being utilized to facilitate the functionality provided by the system 100 and the various methods discloses herein. For example, the system 100 over time may be trained based on data and/or other information provided and/or generated in the system 100, and a reduced amount of computer operations need to be performed by the devices in the system 100 using the processors and memories of the system 100 than compared to traditional methodologies. In such a context, less processing power needs to be utilized because the processors and memories do not need to be dedicated for processing. As a result, there are substantial savings in the usage of computer resources by utilizing the software, techniques, and algorithms provided in the present disclosure. In certain embodiments, various operative functionality of the system 100 may be configured to execute on one or more graphics processors and/or application specific integrated processors.

Notably, in certain embodiments, various functions and features of the system 100 and methods may operate without any human intervention and may be conducted entirely by computing devices. In certain embodiments, for example, numerous computing devices may interact with devices of the system 100 to provide the functionality supported by the system 100. Additionally, in certain embodiments, the computing devices of the system 100 may operate continuously and without human intervention to reduce the possibility of errors being introduced into the system 100. In certain embodiments, the system 100 and methods may also provide effective computing resource management by utilizing the features and functions described in the present disclosure. For example, in certain embodiments, devices in the system 100 may transmit signals indicating that only a specific quantity of computer processor resources (e.g. processor clock cycles, processor speed, etc.) may be devoted to operating the portable radiation detection device 200, operating the irradiation device 180, processing the radiation exposure measurements, analyzing the radiation exposure measurements, storing any data generated by the system 100, transmitting the radiation exposure measurements and/or processed data to a device communicatively linked to the portable radiation detection device 200, and/or performing any other operation conducted by the system 100, or any combination thereof. For example, the signal may indicate a number of processor cycles of a processor may be utilized to process signals received from the radiation detector 225 of the portable radiation detection device 200, and/or specify a selected amount of processing power that may be dedicated to generating or any of the operations performed by the system 100. In certain embodiments, a signal indicating the specific amount of computer processor resources or computer memory resources to be utilized for performing an operation of the system 100 may be transmitted from the first and/or second user devices 102, 111 to the various components of the system 100.

In certain embodiments, any device in the system 100 may transmit a signal to a memory device to cause the memory device to only dedicate a selected amount of memory resources to the various operations of the system 100. In certain embodiments, the system 100 and methods may also include transmitting signals to processors and memories to only perform the operative functions of the system 100 and methods at time periods when usage of processing resources and/or memory resources in the system 100 is at a selected value. In certain embodiments, the system 100 and methods may include transmitting signals to the memory devices utilized in the system 100, which indicate which specific sections of the memory should be utilized to store any of the data utilized or generated by the system 100. Notably, the signals transmitted to the processors and memories may be utilized to optimize the usage of computing resources while executing the operations conducted by the system 100. As a result, such functionality provides substantial operational efficiencies and improvements over existing technologies.

Figure 6:
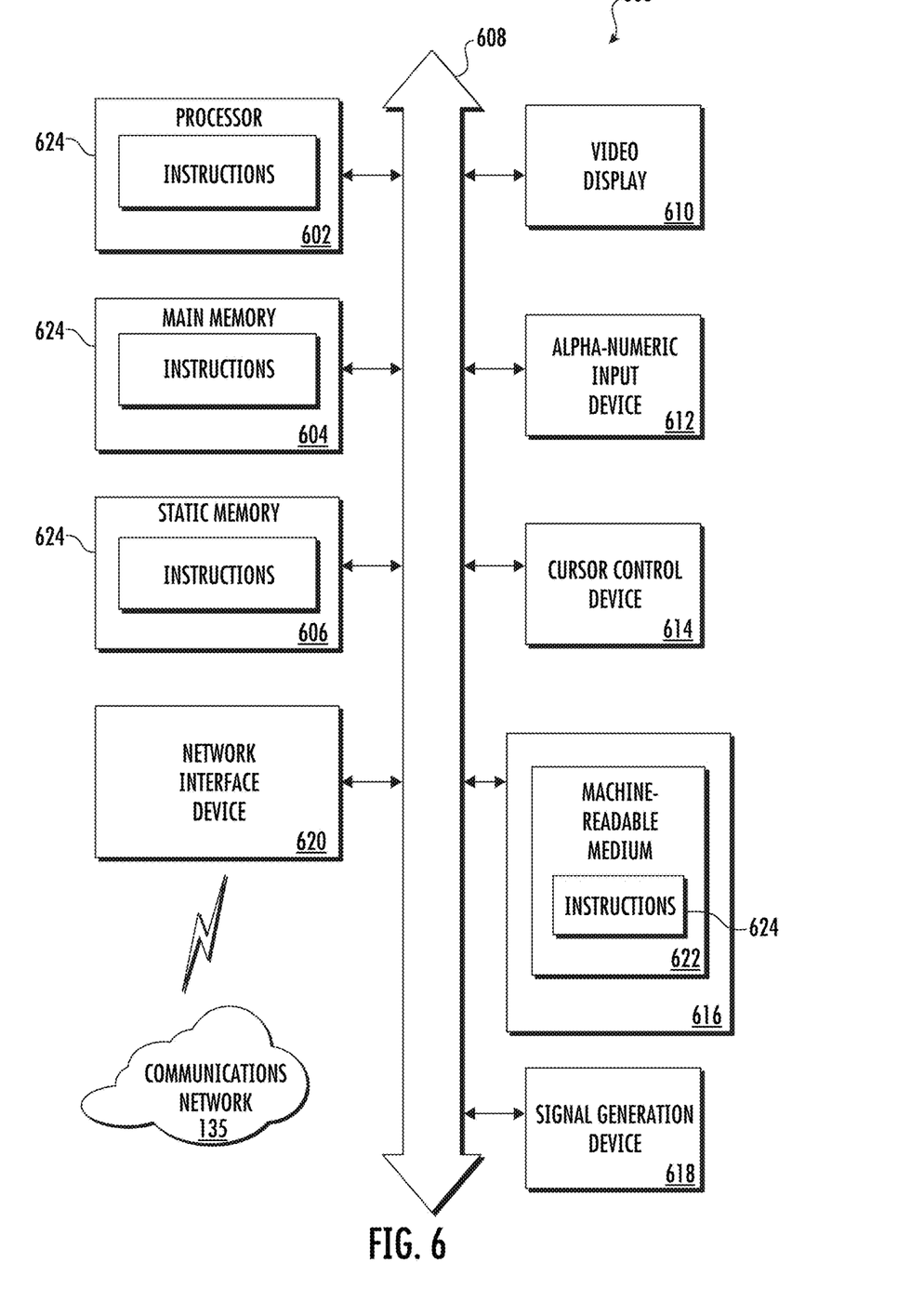
FIG. 6 is a schematic diagram of a machine in the form of a computer system within which a set of instructions, when executed, may cause the machine to perform any one or more of the methodologies or operations associated with providing in-situ radiation measurements within a density equivalent package.

Referring now also to FIG. 6, at least a portion of the methodologies and techniques described with respect to the exemplary embodiments of the system 100 can incorporate a machine, such as, but not limited to, computer system 600, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the irradiation device 180, the portable radiation detection device 200, the server 140, the server 145, the server 150, the database 155, the server 160, any components of the system 100, any other system, program, component and/or device, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610, which may be, but is not limited to, a liquid crystal display (LCD), a flat panel, a solid state display, or a cathode ray tube (CRT). The computer system 600 may include an input device 612, such as, but not limited to, a keyboard, a cursor control device 614, such as, but not limited to, a mouse, a disk drive unit 616, a signal generation device 618, such as, but not limited to, a speaker or remote control, and a network interface device 620.

The disk drive unit 616 may include a machine-readable medium 622 on which is stored one or more sets of instructions 624, such as, but not limited to, software embodying any one or more of the methodologies or functions described herein, including those methods illustrated above. The instructions 624 may also reside, completely or at least partially, within the main memory 604, the static memory 606, or within the processor 602, or a combination thereof, during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 622 containing instructions 624 so that a device connected to the communications network 135, another network, or a combination thereof, can send or receive voice, video or data, and communicate over the communications network 135, another network, or a combination thereof, using the instructions. The instructions 624 may further be transmitted or received over the communications network 135, another network, or a combination thereof, via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A portable device for measuring radiation in-situ, comprising:
   a cylindrical housing;
   a phantom material within the housing representing an object or substance to be irradiated by an irradiator;
   wherein the phantom material has density equivalence with the object or substance to be irradiated;

a radiation detector embedded within the phantom material, wherein the radiation detector measures an amount of exposure of the phantom material to radiation when an irradiation device emits the radiation within range of the phantom material;

a radiation-shielded battery associated with the portable device and providing power to the portable device; and a processor configured to
receive a signal indicative of an amount of exposure of the phantom material to the radiation.

2. The portable device of claim 1, wherein the processor is further configured to analyze the signal including the measurement.

3. The portable device of claim 1, wherein the processor is further configured to store the information associated with the measurement.

4. The portable device of claim 1, wherein the processor is further configured to transmit information associated with the measurement including the amount of exposure to a remote device.

5. The portable device of claim 1, further comprising a transceiver, wireless chip, or both, configured to transmit information associated with the measurement to a remote device.

6. The portable device of claim 1, wherein the processor is further configured to process the signal including the measurement to generate a numerical value associated with the amount of exposure of the phantom material to the radiation.

7. The portable device of claim 1, further comprising a cable configured to facilitate transmission of information associated with the measurement to a remote device connected to the cable.

8. The portable device of claim 1, wherein the radiation detector comprises an ion chamber; a semiconductor-based radiation detector, a solid-state-based radiation detector, or a scintillator.

9. The portable device of claim 1, further comprising a universal serial bus port for facilitating transmission of information associated with the measurement to a computing device connected to the universal serial bus port.

10. The portable device of claim 1, wherein the portable device is cylindrical in shape, rectangular in shape, square in shape, polygonal in shape, any shape mimicking any object shape, any shape mimicking a body part shape, any shape mimicking a food item shape, any shape mimicking an organism shape, or any other shape.

11. The portable device of claim 1, wherein the housing comprises a plurality of portions, wherein the processor is housed in a first portion of the plurality of portions and the radiation detector and the phantom material are housed in a second portion of the plurality of portions.

12. A device for measuring radiation in-situ, comprising:
a cylindrical housing;
a phantom material within the housing representing an object or substance to be irradiated by an irradiator;
wherein the phantom material has density equivalence with the object or substance to be irradiated;
a radiation-shielded battery associated with the portable device and providing power to the portable device; and
a radiation detector embedded within the phantom material, wherein the radiation detector measures an amount of exposure of the phantom material to radiation while an irradiation device emits the radiation within range of the phantom material.

* * * * *